(12) United States Patent
Hornbostel et al.

(10) Patent No.: US 9,891,331 B2
(45) Date of Patent: Feb. 13, 2018

(54) EXPLORATION METHOD AND SYSTEM FOR DETECTION OF HYDROCARBONS FROM THE WATER COLUMN

(71) Applicants: Scott C. Hornbostel, Houston, TX (US); Homer C. Jones, Houston, TX (US); Julie A. O'Leary, Houston, TX (US)

(72) Inventors: Scott C. Hornbostel, Houston, TX (US); Homer C. Jones, Houston, TX (US); Julie A. O'Leary, Houston, TX (US)

( * ) Notice: Subject to any disclaimer, the term of this patent is extended or adjusted under 35 U.S.C. 154(b) by 440 days.

(21) Appl. No.: 14/579,481

(22) Filed: Dec. 22, 2014

(65) Prior Publication Data

US 2015/0253443 A1  Sep. 10, 2015

Related U.S. Application Data

(60) Provisional application No. 61/949,802, filed on Mar. 7, 2014.

(51) Int. Cl.
*G01V 1/38* (2006.01)
*G01V 1/30* (2006.01)

(52) U.S. Cl.
CPC ............... *G01V 1/30* (2013.01); *G01V 1/38* (2013.01); *G01V 2210/60* (2013.01)

(58) Field of Classification Search
CPC ......... G01V 1/38; G01V 1/30; G01V 2210/60
See application file for complete search history.

(56) References Cited

U.S. PATENT DOCUMENTS

| | | |
|---|---|---|
| 3,835,710 A | 9/1974 | Pogorski |
| 3,862,576 A | 1/1975 | Pogorski |
| 3,961,187 A | 6/1976 | Barringer |
| 4,001,764 A | 1/1977 | Holland et al. |
| 4,378,055 A | 3/1983 | Bartz |
| 4,434,364 A | 2/1984 | Correa et al. |
| 4,560,664 A | 12/1985 | Demaison et al. |
| 4,833,915 A | 5/1989 | Radd et al. |
| 5,388,456 A | 2/1995 | Kettel |

(Continued)

FOREIGN PATENT DOCUMENTS

| | | |
|---|---|---|
| CN | 101644781 | 2/2010 |
| EP | 0 678 758 | 4/1994 |

(Continued)

OTHER PUBLICATIONS

Crutchley, Gareth J., et al., "Seismic imaging of gas conduits beneath seafloor seep sites in shallow marine gas hydrate province, Hikurangi Margin, New Zealand", Marine Geology (2009).*

(Continued)

*Primary Examiner* — Krystine E Breier
(74) *Attorney, Agent, or Firm* — ExxonMobil Upstream Research Company—Law Department (57) ABSTRACT

A method for detecting hydrocarbons is described. The method includes obtaining seismic data associated with a body of water in a survey region. Then, a filter is applied to at least a portion of the seismic data to enhance diffraction anomaly signals with respect to horizontal or nearly horizontal signals associated with the water-column to form filtered seismic data. Once filtered, seepage locations are identified from the filtered seismic data.

21 Claims, 5 Drawing Sheets

(56) References Cited

U.S. PATENT DOCUMENTS

| | | | |
|---|---|---|---|
| 5,439,800 A | 8/1995 | Thompson | |
| 5,798,982 A | 8/1998 | He et al. | |
| 6,246,963 B1 | 6/2001 | Cross et al. | |
| 6,509,566 B1 | 1/2003 | Wamsley et al. | |
| 6,514,945 B1 | 2/2003 | Beyer et al. | |
| 6,578,405 B2 | 6/2003 | Kleinberg et al. | |
| 6,613,520 B2 | 9/2003 | Ashby | |
| 6,645,769 B2 | 11/2003 | Tayebi et al. | |
| 6,754,588 B2 | 6/2004 | Cross et al. | |
| 6,810,332 B2 | 10/2004 | Harrison | |
| 6,826,483 B1 | 11/2004 | Anderson et al. | |
| 6,873,570 B2 | 3/2005 | Zhu et al. | |
| 6,888,127 B2 | 5/2005 | Jones et al. | |
| 6,985,841 B2 | 1/2006 | Barroux | |
| 7,011,154 B2 | 3/2006 | Maher et al. | |
| 7,124,030 B2 | 10/2006 | Ellis | |
| 7,174,254 B2 | 2/2007 | Ellis | |
| 7,210,342 B1 | 5/2007 | Sterner et al. | |
| 7,249,009 B2 | 7/2007 | Ferworn et al. | |
| 7,297,661 B2 | 11/2007 | Beyer et al. | |
| 7,328,107 B2 | 2/2008 | Strack et al. | |
| 7,337,660 B2 | 3/2008 | Ibrahim et al. | |
| 7,387,021 B2 | 6/2008 | DiFoggio | |
| 7,395,691 B2 | 7/2008 | Sterner et al. | |
| 7,520,158 B2 | 4/2009 | DiFoggio | |
| 7,526,418 B2 | 4/2009 | Pita et al. | |
| 7,529,626 B1 | 5/2009 | Ellis | |
| 7,542,850 B2 | 6/2009 | Humphrey et al. | |
| 7,596,480 B2 | 9/2009 | Fung et al. | |
| 7,617,082 B2 | 11/2009 | Childs et al. | |
| 7,676,326 B2 | 3/2010 | Podladchikov et al. | |
| 7,687,769 B2 | 3/2010 | Indo et al. | |
| 7,692,429 B2 | 4/2010 | MacGregor et al. | |
| 7,704,746 B1 | 4/2010 | White et al. | |
| 7,728,291 B2 | 6/2010 | Bello | |
| 7,809,538 B2 | 10/2010 | Thomas | |
| 7,821,635 B2 | 10/2010 | Pope et al. | |
| 7,969,152 B2 | 6/2011 | Velikhov et al. | |
| 8,033,756 B2 | 10/2011 | Adamson | |
| 8,045,417 B2 | 10/2011 | Levin | |
| 8,071,295 B2 | 12/2011 | Ashby | |
| 8,120,362 B2 | 2/2012 | Combee | |
| 8,219,320 B2 | 7/2012 | Saenger | |
| 8,299,424 B2 | 10/2012 | Camilli | |
| 8,315,804 B2 | 11/2012 | Amundsen | |
| 8,316,934 B2 | 11/2012 | Pietrobon | |
| 8,476,016 B2 | 7/2013 | Ashby | |
| 8,492,153 B2 | 7/2013 | Jones et al. | |
| 8,502,974 B2 | 8/2013 | Johnsen | |
| 8,505,375 B2 | 8/2013 | Smalley | |
| 8,577,613 B2 | 11/2013 | Bryant et al. | |
| RE44,728 E | 1/2014 | Pope et al. | |
| 8,695,703 B2 | 4/2014 | Dinariev et al. | |
| 8,714,246 B2 | 5/2014 | Pop et al. | |
| 8,767,205 B2 | 7/2014 | Johnsen | |
| 8,867,311 B2 | 10/2014 | Rikoski | |
| 8,873,337 B2 | 10/2014 | Rikoski | |
| 8,879,357 B2 | 11/2014 | Rikoski | |
| 2002/0120429 A1 | 8/2002 | Ortoleva | |
| 2006/0039237 A1 | 2/2006 | Mori | |
| 2006/0154306 A1 | 7/2006 | Kotlar et al. | |
| 2007/0265782 A1* | 11/2007 | Kleinberg | G01V 1/288 702/6 |
| 2008/0040086 A1 | 2/2008 | Betancourt et al. | |
| 2008/0059140 A1 | 3/2008 | Salmon et al. | |
| 2008/0097735 A1 | 4/2008 | Ibrahim et al. | |
| 2008/0099241 A1 | 5/2008 | Ibrahim et al. | |
| 2008/0112266 A1* | 5/2008 | Aoyama | G01S 15/88 367/131 |
| 2008/0147326 A1 | 6/2008 | Ellis | |
| 2009/0071239 A1 | 3/2009 | Rojas et al. | |
| 2009/0150124 A1 | 6/2009 | Wilt et al. | |
| 2010/0015612 A1 | 1/2010 | Pelham et al. | |
| 2010/0086180 A1 | 4/2010 | Wallace | |
| 2010/0153015 A1 | 6/2010 | Podladchikov et al. | |
| 2010/0153050 A1 | 6/2010 | Zumberge et al. | |
| 2010/0155078 A1 | 6/2010 | Walters et al. | |
| 2010/0257004 A1 | 10/2010 | Perlmutter et al. | |
| 2010/0279290 A1 | 11/2010 | Sleat et al. | |
| 2011/0004367 A1 | 1/2011 | Saunders et al. | |
| 2011/0250582 A1 | 10/2011 | Gates et al. | |
| 2011/0264430 A1 | 10/2011 | Tapscott et al. | |
| 2011/0308790 A1 | 12/2011 | Strapoc et al. | |
| 2012/0036923 A1 | 2/2012 | Valentine | |
| 2012/0052564 A1 | 3/2012 | Shigeura et al. | |
| 2012/0069702 A1 | 3/2012 | Muyzert et al. | |
| 2012/0134749 A1 | 5/2012 | Darrah | |
| 2012/0165215 A1 | 6/2012 | Andersen et al. | |
| 2012/0204781 A1 | 8/2012 | Chun et al. | |
| 2012/0261191 A1 | 10/2012 | Klomp et al. | |
| 2012/0281503 A1 | 11/2012 | Rikoski | |
| 2012/0281504 A1 | 11/2012 | Rikoski | |
| 2012/0281505 A1 | 11/2012 | Rikoski | |
| 2012/0281506 A1 | 11/2012 | Rikoski | |
| 2012/0281507 A1 | 11/2012 | Rikoski | |
| 2012/0312530 A1 | 12/2012 | Pope et al. | |
| 2013/0030712 A1 | 1/2013 | Ashby | |
| 2013/0030714 A1 | 1/2013 | Ashby | |
| 2013/0037707 A1 | 2/2013 | Lamberti et al. | |
| 2013/0083621 A1 | 4/2013 | Rikoski | |
| 2013/0091925 A1 | 4/2013 | Darrah et al. | |
| 2013/0103337 A1 | 4/2013 | Eiler | |
| 2013/0116126 A1 | 5/2013 | Ashby et al. | |
| 2013/0124108 A1 | 5/2013 | Eiler | |
| 2014/0011687 A1 | 1/2014 | Ashby | |
| 2014/0011692 A1 | 1/2014 | Ashby | |
| 2014/0152455 A1 | 6/2014 | Giori et al. | |
| 2014/0162274 A1 | 6/2014 | Kunin et al. | |
| 2014/0224167 A1 | 8/2014 | Gasparoni et al. | |
| 2014/0256055 A1* | 9/2014 | Pottorf | G01V 9/007 436/163 |
| 2014/0283585 A1 | 9/2014 | Saether | |
| 2014/0288853 A1 | 9/2014 | Dreyfus et al. | |
| 2014/0303895 A1 | 10/2014 | Dreyfus et al. | |

FOREIGN PATENT DOCUMENTS

| | | |
|---|---|---|
| EP | 2 113 796 | 11/2009 |
| GB | 2478511 | 9/2011 |
| RU | 2434250 | 6/2010 |
| WO | 2003/012390 | 2/2003 |
| WO | 2004/025261 | 3/2004 |
| WO | 2007/008932 | 1/2007 |
| WO | 2012/016215 | 2/2012 |
| WO | 2013/119350 | 8/2013 |
| WO | 2013/148442 | 10/2013 |

OTHER PUBLICATIONS

Marino et al., Processing of High-Resolution, Shallow seismic profiles, Guanabara Bay—Rio de Janeiro State, Brazil, Sociedade Brasileira de Geofisica 2013.*

Aeschbach-Hertig, W., et al., (2000), "Palaeotemperature reconstruction from noble gases in ground water taking into account equilibrium with entrapped air", *Nature*, 405, pp. 1040-1044.

Ballentine, C. J., et al., (2002), "Production, release and transport of noble gases in the continental crust", *Reviews in Mineralogy and Geochemistry*, 47, pp. 481-538.

Ballentine, C.J., et al., (2002), "Tracing Fluid Origin, Transport and Interaction in the Crust", *Reviews in Mineralogy and Geochemistry*, 47, pp. 539-614.

Ballentine, C.J., et al., (1996), "A Magnus Opus: Helium, neon, and argon isotopes in a North Sea oilfield", *Geochemica et Cosmochimica Acta*, 60(5), pp. 831-849.

Ballentine, C.J., et al., (1991), "Rare Gas Constraints on Hydrocarbon Accumulation, Crustal Degassing and Groundwater Flow in the Pannonian Basin", *Earth and Planetary Science Letters*, 105, pp. 229-246.

Battani, A., et al., (2010), "Trinidad Mud Volcanoes: The origin of the gas", *Shale Tectonics: AAPG Bulletin Memoir*, 93, pp. 225-238.

(56) References Cited

OTHER PUBLICATIONS

Bell, R. J., et al., (2007), "Calibration of an in situ membrane inlet mass spectrometer for measurements of dissolved gases and volatile organics in seawater", *Environ. Sci. Technol.* 41, pp. 8123-8128.

Bosch, A., et al., (1988), "Natural Gas Association with water and oil as depicted by atmospheric noble gases: case studies from the southeastern Mediterranean Coastal Plain", *Earth and Planetary Science Letters*, 87, pp. 338-346.

Camilli, R., et al., (2010), "Tracking Hydrocarbon Plume Transport and Biodegradation at Deepwater Horizon", *Science* 330, pp. 201-204.

Camilli. R.C., et al., (2009), "Characterizing Spatial and Temporal Variability of Dissolved Gases in Aquatic Environments with in situ Mass Spectrometry", *Environmental Science and Technology* 43(13), pp. 5014-5021.

Camilli, R., et al. (2007), "Characterizing Marine Hydrocarbons With In-Situ Mass Spectrometry", IEEE/MTS Oceans (IEEE/MTS, Vancouver, Canada, 2007), pp. 1-7.

Chung, H.M., et al., (1988), "Origin of gaseous hydrocarbons in subsurface environments: theoretical considerations of carbon isotope distribution in M. Schoell (Ed.)", *Origins of Methane in the Earth. Chem. Geol.*, 71, pp. 97-103.

Crovetto, R., et al., (1982), "Solubilities of inert gases and methane in $H_2O$ and $D_2O$ in the temperature range of 300 to 600K", *Journal of Chemical Physics* 76(2), pp. 1077-1086.

Dunn-Norman, S., et al, (2004), "Reliability of Pressure Signals in Offshore Pipeline Leak Detection", *Final Report to Dept. of the Interior*, MMS TA&R Program SOL 1435-01-00-RP-31077, pp. 1-86.

Fomel, S., et al., (2007), Poststack velocity analysis by separation and imaging of seismic diffractions, Geophysics, 72(6), pp. 89-94.

Heaton, T.H.E., et al., (1981), "'Excess air' in groundwater", *Journal of Hydrology*, 50, pp. 201-216.

Hohl, D, et al., (2010), "Energy, Environment and Climate Directorate White Paper", *DCO Energy, Environment and Climate Workshop*, pp. 1-38.

Holbrook, W.S., et al., (2003), "Thermohaline fine structure in an oceanographic front from seismic reflection profiling", *Science*, v. 301, pp. 821-824.

Huc, A., (2003), "Petroleum Geochemistry at the Dawn of the 21$^{st}$ Century", *Oil & Gas Science and Technology—Rev. Ifp*, vol. 58, No. 2, pp. 233-241.

IP.com (2012), Detection and Localization of Seafloor Hydrocarbon and Related Fluid Seeps Using Acoustic Waveguide Remote Sensing (OAWRS), pp. 1-2.

Kharaka, Y.K., et al., (1988), "The solubility of noble gases in crude oil at 25-100° C.", *Applied Geochemistry*, 3, pp. 137-144.

Kinsey, J.C., et al., (2011), "Assessing the deepwater horizon oil spill with the sentry autonomous underwater vehicle", *IROS'11—2011 IEEE/RSJ International Conference on Intelligent Robots and Systems: Celebrating 50 Years of Robotics.* IEEE International Conference on Intelligent Robots and Systems, pp. 261-267.

Jakuba, M.V., et al., (2011), "Toward automatic classification of chemical sensor data from autonomous underwater vehicles", *AIROS'11—2011 IEEE/RSJ International Conference on Intelligent Robots and Systems: Celebrating 50 Years of Robotics.* IEEE International Conference on Intelligent Robots and Systems, pp. 4722-4727.

Lamontagne, R.A., et al., (2001), "Response of METS Sensor to Methane Concentrations Found on the Texas-Louisiana Shelf in the Gulf of Mexico", *Naval Research Laboratory report NRL/MR/6110*—01-8584, pp. 1-13.

Larter, S.R., et al., (1995), "Reservoir geochemistry: methods, applications and opportunities", *Geological Society of London Special Publication*, 86, pp. 5-32.

Liu, W., et al. (2007), "Ternary Geochemical-Tracing System in Natural Gas Accumulation", *Science in China Series D-Earth Sciences*, vol. 50, No. 10, pp. 1494-1503.

MacDonald, I.R., et al., (2002), "Transfer of hydrocarbons from natural seeps to the water column and atmosphere", Geofluids, 2(2), pp. 95-107.

Makris NC, et al. (2006), "Fish Population and Behavior Revealed by Instantaneous Continental Shelf-Scale Imaging", *Science*, 311, pp. 660-663.

Mangelsdorf, K., et al., (2011), "Microbial Lipid Markers Within and Adjacent to Challenger Mound in the Belgica Carbonate Mound Province, Porcupine Basin, Offshore Ireland (IODP Expedition 307)", *Marine Geology* 282, pp. 91-101.

Narr, W.M., et al., (1984), "Origin of reservoir fractures in Little Knife Field, North Dakota", *American Association of Petroleum Geologists Bulletin*, 68, pp. 1087-1100.

Ozgul, E., (2002), "Geochemical Assessment of Gaseous Hydrocarbons: Mixing of Bacterial and Thermogenic Methane in the Deep Subsurface Petroleum System, Gulf of Mexico Continental Slope", *Thesis, Texas A&M University*, pp. 1-167.

Pinti, D.L., et al., (1995), "Noble gases in crude oils from the Paris Basin: Implications for the origin of fluids and constraints on oil-was-gas-interactions", *Geochemica et Cosmochimica Acta*, 59(16), pp. 3389-3404.

Prinzhofer, A., et al. (2003), "Gas Isotopes Tracing: An Important Tool for Hydrocarbons Exploration", *Oil & Gas Science and Technology—Rev. Ifp*, vol. 58, No. 2, pp. 299-311.

Ruddick, B., et al., (2009), Water Column Seismic Images as Maps of Temperature Gradient, Oceanography, 22(1), pp. 192-205.

Sackett, WM, (1977), "Use of Hydrocarbon Sniffing in Offshore Exploration", *Journal of Geochemical Exploration* 7, pp. 243-254.

Smith, S.P., (1985), "Noble gas solubility in water at high temperature", *EOS Transactions of the American Geophysical Union*, 66, pp. 397.

Valentine, D.L, et al., (2010), "Asphalt Volcanoes as a Potential Source of Methane to Late Pleistocene Coastal Waters", *Nature Geoscience Letters*, DOI: 10.1038/NGEO848, pp. 345-348.

Zaikowski, A., et al., (1990), "Noble gas and methane partitioning from ground water: An aid to natural gas exploration and reservoir evaluation", *Geology*, 18, pp. 72-74.

Zartman, R.E., et al., (1961), "Helium, argon, and carbon in some natural gases", *Journal of geophysical research*, 66(1), pp. 227-306.

Zhang, Y., et al., (2011), "A peak-capture algorithm used on an autonomous underwater vehicle in the 2010 Gulf of Mexico oil spill response scientific survey", *Journal of Field Robotics*, vol. 28, No. 4, pp. 484-496.

Judd. A., et al., (1997), "Contributions to Atmospheric Methane by Natural Seepages on the UK Continental Shelf", Marine Geology, vol. 137, pp. 165-189.

Marino, I.K., et al., (2013), "Processing of High-Resolution Shadow Seismic Profiles, Guanabara Bay—Rio De Janeior State, Brazil", Revista Brasileira de Geofisica, vol. 31(4), pp. 579-594.

Bansal, et al., (2005), "Diffraction Enhancement in Prestack Seismic Data", *Geophysics, Society of Exploration Geophysicists*, vol. 70, No. 3, pp. V73-V79.

Hildebrand, J. A., et al. (2012), "Seismic Imaging of the Water-Column Deep Layer Associated With the Deepwater Horizon Oil Spill", *Geophysics, Society of Exploration Geophysicists*, vol. 77, No. 2, pp. EN11-EN16.

IP.com Journal (2012), "Detection of Underwater Hydrocarbon and Related Fluid Seeps Using Reflection Seismic Data", IPCOM000218068D.

Kuscu, I, et al., (2005), "Seafloor Gas Seeps and Sediment Failures Triggered by the Aug. 17, 1999 Earthquake in the Eastern Part of the Gulf of Izmit, Sea of Marmar, NW Turkey", *Marine Geology*, Vo. 215, No. 3-4, pp. 193-214.

Rollet, N, et al., (2006), "Characterisation and Correlation of Active Hydrocarbon Seepage Using Geophysical Data Sets: An Example From The Tropical, Carbonate Yampi Shelf, Northwest Australia", *Marine and Petroleum Geology*, vol. 23, No. 2, pp. 145-164.

Xenaki, A., et al., (2013), "Modeling and Detection of Oil in Sea Water", *the Journal of The Acoustical Society of America, American Institute of Physics for The Acoustical Society of America*, vol. 134, No. 4, pp. 2790-2798.

Magoon et al. (1994) "The Petroleum System—From Source to Trap", *AAPG Memoir 60*, pp. 3-24.

(56) References Cited

OTHER PUBLICATIONS

Sandrea et al. (2007) "Global Oil Reserves—Recovery Factors Leave Vast Target for EOR Technologies", *Oil & Gas Journal*, pp. 1-8.
Truhlar et al. (1991) "Simple pertubation theory estimates of equilibrium constants from force fields", *Journal of Chemical Physics*, vol. 94, No. 1, pp. 357-359.

\* cited by examiner

EXPLORATION METHOD AND SYSTEM FOR DETECTION OF HYDROCARBONS FROM THE WATER COLUMN

CROSS-REFERENCE TO RELATED APPLICATION

This application claims the benefit of U.S. Provisional Patent Application 61/949,802 filed Mar. 7, 2014 entitled EXPLORATION METHOD AND SYSTEM FOR DETECTION OF HYDROCARBONS FROM THE WATER COLUMN, the entirety of which is incorporated by reference herein.

FIELD OF THE INVENTION

This invention relates generally to the field of hydrocarbon exploration. Specifically, the invention is a method for detecting hydrocarbons (e.g., oil and/or gas), which include using remote sensing to detect bubbles in the water column.

BACKGROUND

This section is intended to introduce various aspects of the art, which may be associated with exemplary embodiments of the present disclosure. This discussion is believed to assist in providing a framework to facilitate a better understanding of particular aspects of the disclosed methodologies and techniques. Accordingly, it should be understood that this section should be read in this light, and not necessarily as admissions of prior art.

Hydrocarbon reserves are becoming increasingly difficult to locate and access, as the demand for energy grows globally. Typically, various technologies are utilized to collect measurement data and then to model the location of potential hydrocarbon accumulations. The modeling may include factors, such as (1) the generation and expulsion of liquid and/or gaseous hydrocarbons from a source rock, (2) migration of hydrocarbons to an accumulation in a reservoir rock, (3) a trap and a seal to prevent significant leakage of hydrocarbons from the reservoir. The collection of these data may be beneficial in modeling potential locations for subsurface hydrocarbon accumulations.

At present, reflection seismic is the dominant technology for the identification of hydrocarbon accumulations. This technique has been successful in identifying structures that may host hydrocarbon accumulations, and may also be utilized to image the hydrocarbon fluids within subsurface accumulations. Typically, the body of water located above a subsurface region is ignored during processing of the seismic data, which focuses on the subsurface region. That is, the seismic processing is directed to identifying subsurface structures that may include hydrocarbons.

To determine the location of hydrocarbons, certain processes involve locating seepages from the seafloor, which are referred to as hydrocarbon seeps. These hydrocarbon seeps may result in bubble plumes in the water column, which may indicate the presence of an active hydrocarbon system. The identification of these bubble plumes is useful in assessing the exploration potential of a prospect. One method for detecting these bubble plumes uses high frequency sources and detectors in a device (e.g., a multi-beam echo sounder). This device can be tuned at close to the bubble resonance frequency and thus be effective at detecting these plumes. The high frequencies typically include 1 kilo Hertz and above. See, e.g., Leifer, I., R. Sassen, P. Stine, R. Mitchell, and N. Guinasso (2002), Transfer of hydrocarbons from natural seeps to the water column and atmosphere, Geofluids, 2(2), 95-107, However, such techniques are not typically performed as part of conventional seismic surveys. That is, as these techniques involve an additional expense, they are not performed.

Lower frequency seismic data can be analyzed for evidence of water-column layering in a field known as "seismic oceanography." See, e.g., Holbrook, W. S., P. Páramo, S. Pearse, and R. W. Schmitt (2003), Thermohaline Fine Structure in an Oceanographic Front from Seismic Reflection Profiling, Science, 301(5634), 821-824, and Ruddick, B., H. Song, C. Dong, and L. Pinheiro (2009), Water Column Seismic Images as Maps of Temperature Gradient, Oceanography, 22(1), 192-205. In this field, horizontal and nearly horizontal signals are produced by thermohaline (temperature/salinity) boundaries in the water column. These signals (along with residual layered source artifacts) constitute noise that can interfere with bubble-plume signals (i.e., the high-angle diffraction anomalies in the water layer). That is, the horizontal and sub-horizontal information may hinder identification of bubble-plume signals.

Given the existing technology, an enhancement to exploration techniques that enhance the ability to detect hydrocarbon seeps is needed. The proposed technique may provide a pre-drill technology that determines the presence and location of hydrocarbon seepages from the seafloor based on measured seismic data. Further, this method may be utilized to locate seafloor hydrocarbon seeps accurately and cost-effectively over the basin-to-play scale as a means to enhance basin assessment and to high-grade areas for exploration.

SUMMARY

In one embodiment, a method for detecting hydrocarbons is described. The method includes obtaining seismic data associated with a body of water in a survey region; applying a filter to at least a portion of the seismic data to enhance diffraction anomaly signals with respect to horizontal or nearly horizontal signals associated with the water-column to form filtered seismic data; and determining seepage locations based on the filtered seismic data.

In another embodiment, a computer system for detecting hydrocarbons is described. The computer system includes a processor; memory coupled to the processor; and a set of instructions, stored in the memory. The set of instructions, when executed by the processor, are configured to: obtain seismic data associated with a body of water in a survey region; apply a filter to at least a portion of the seismic data to enhance diffraction anomaly signals with respect to horizontal or nearly horizontal signals associated with the water-column to form filtered seismic data; and determine seepage locations based on the filtered seismic data.

In other embodiments, the filter may be applied to mask or discard certain portions of the seismic data. For example, the filter may be applied to maintain seismic data in the range between about 50% and about 5% of the maximum dip of a diffraction and discard data outside the range. Also, the filter may mask the seismic data from the surface of the body of water to 700 meters below the surface of the body of water.

BRIEF DESCRIPTION OF THE DRAWINGS

The foregoing and other advantages of the present disclosure may become apparent upon reviewing the following detailed description and drawings of non-limiting examples of embodiments.

DETAILED DESCRIPTION

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

To begin, a seep is a natural surface leak of gas and/or oil. The hydrocarbon (e.g., petroleum) reaches the surface of the Earth's crust along fractures, faults, unconformities, or bedding planes, or is exposed by surface erosion into porous rock. The presence of an oil or gas seep at the seafloor or sea surface indicates that three basic geological conditions critical to petroleum exploration have been fulfilled. First, organic-rich rocks have been deposited and preserved (source presence). Second, the source has been heated and matured (e.g., source maturity). Third, secondary migration has taken place (e.g., hydrocarbon migration from the source location). While a surface seep of thermogenic hydrocarbons does not ensure that material subsurface oil and gas accumulations exist, seeps provide a mechanism to de-risk elements of an exploration play. That is, the seep may be utilized to remove uncertainty from the modeling of the subsurface.

In the present disclosure, an enhancement to exploration techniques that filters data (e.g., the seismic data) in at least a portion of the water column is described. As hydrocarbon occurrence data is typically not easily obtained for a regional scale and not appropriately evaluated in the context of integrated hydrocarbon systems, the ability to identify and characterize seeps and hydrocarbons in the water column provides significant enhancements for evaluating and capturing opportunities. Further, the use of existing seismic data provides cost effective enhancements for evaluating and capturing opportunities. As a result, the present techniques provide a method to locate seepages on the seafloor in a more accurate and cost-effective manner, which enhances basin assessment.

A seep often creates a localized variation or anomaly in the water-column physical properties, such as acoustic velocity and/or density. The seismic acquisition method identifies physical property anomalies as a diffraction pattern in the recorded or processed data. This pattern is defined as a "diffraction anomaly" or "diffraction anomaly signal." In the present techniques, seismic data from the water-column of a body of water is processed with a screening filter to identify and detect seepage locations based on the filtered seismic data. The method may also include identifying diffraction anomalies in the filtered seismic data as the seepage locations. The filtering may be used with the measured seismic data and/or with stacked seismic data. Also, the method may include removing or masking portions of the subsurface seismic data (e.g., the subsurface portion, such portion below the sea floor, or portion below a certain depth below the sea floor, or a portion above a certain depth in the water column) prior to applying the filter on the seismic data.

Diffraction anomalies have been used in solid-earth geophysics for specific purposes, such as imaging of faults. See, for example, Fomel, S., Landa, E., and Taner, M. T. (2007), Poststack velocity analysis by separation and imaging of seismic diffractions, Geophysics, 72(6), 89-94. In this application, the non-diffraction energy is removed by a complex tracking of strong and continuous signals. In the present techniques, a less-complex filter is suggested that removes horizontal signals and noises based on dip. The proposed approach is also extended to imaging in the water column and applied to the detection of bubble plumes.

The screening filter enhances the reliability of the seepage location determination by lessening uncertainty associated with the identified seepage locations. That is, the term "enhance" means that the seepage-related diffraction anomaly is made more obvious by the screening filter (e.g., by increasing its amplitude relative to the other non-diffraction signals in the data). The screening filter removes flat-lying energy from the seismic data (e.g., portion of the seismic data associated with the water column being reviewed), while retaining dip characteristic of expected plumes from seepage locations. The filtering is beneficial because it removes portions of the dip spectrum that are dominated by residual source noise and confusing water-column layering. The filtering is also beneficial at removing portions of the random noise in the water column. This is because random noise is constituted as a sum of many dips and a range of these dips are removed by the filter. The result is a reduced residual noise level. The random noise in the water-column data is that part of the measured data that comes from something other than the current applied seismic source. This can include ambient (e.g., environmental) noises or unwanted parts of the acquisition system such as streamer (e.g., receiver) towing noise or leftover effects from previous source applications.

As an example, a weighted trace mix may be the preferred means for implementing the screening filter because full FK (frequency-wave number) filters tend to spread artifacts from the much-stronger water bottom into the weaker overlying water column. The trace weights preferably sum to zero to ensure removal of flat energy. A set of weights may include the set of 0.25*{−0.25, −0.5, −0.25, 0.0, 0.5, 1.0, 0.5, 0.0, −0.25, −0.5, −0.25} for an 11-trace weighted mix. The number of traces between the negative and positive peaks (e.g., four traces for −0.5 to 1.0 in this example) is set so that a dip of interest at the dominant frequency passes unattenuated.

Figure 3:
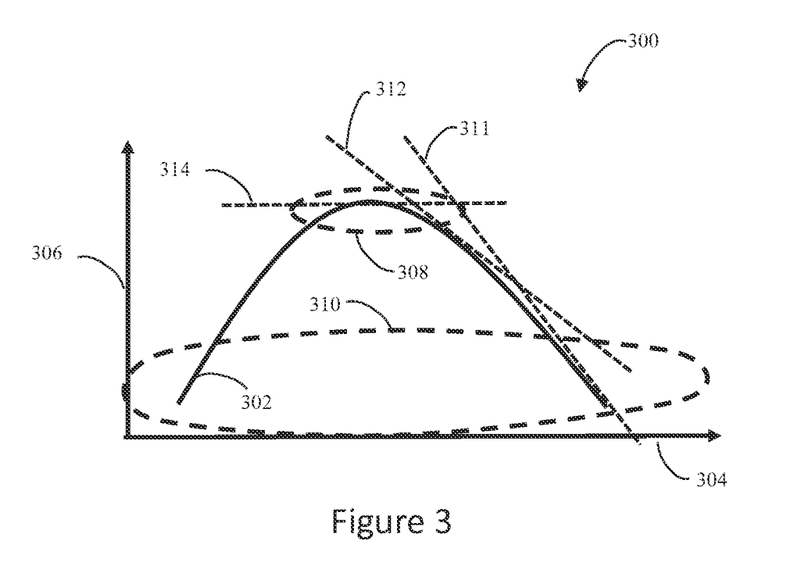
FIG. 3 is an exemplary response for a vertically moving bubble.

As an example, the gap between the positive and negative peak values in the weights can be determined in various methods. Specifically, the method may include:

(i) determining a desired dip to keep without attenuation. In this and all subsequent references to dip, it is understood that the dip may be positive or negative (i.e., time increasing or decreasing as the distance increases). This equivalency follows from the symmetry of the diffraction pattern as illustrated in FIG. 3. For simplicity, positive dips are mentioned in the text, but these should be understood to mean positive or negative dips of the same absolute value. Begin with the maximum dip that comes from a horizontally traveling arrival:

Dip_max=(2/Vw)*1000 that equals approximately 1.3 ms/m (milliseconds per meter) where Vw is the water velocity in m/s (meters per second). This maximum dip is often not present in the water column data because of acquisition parameters (e.g., receiver arrays) that aim at reducing horizontally traveling arrivals. As a result, the dip that is targeted to pass unattenuated (i.e., "Dip_pass") is some fraction of this value (say 20%) or 0.26 ms/m. A smaller fraction of this maximum dip, such as from 10% to 0.1% or 0.13 ms/m to 0.01 ms/m in this example, may be defined as "nearly horizontal." The range from horizontal (0 ms/m) to nearly horizontal (0.13 ms/m) may be targeted for removal or attenuation by the filter. This aspect may be referred to as removing the horizontal and nearly horizontal signals.

(ii) the dominant frequency in the water column data is determined using any standard estimation technique (including simply counting cycles). From this the half-period is determined as T_half=1/(2*freq) that equals approximately 12.5 ms, for example, when the dominant frequency "freq" equals 40 Hz (Hertz).

(iii) the distance is determined for the desired dip to move by the half-period time:

Dist=T_half/Dip_pass that equals (12.5 ms/0.26 ms/m) or approximately 48 m (meters) in this example.

(iv) the number of traces is determined that comes close to this required distance based on the known trace spacing. In the current example, a trace spacing of 12 m (meters) would require four (4) trace spacing between the positive and negative peaks in the weighting function as initially given in the sample set of weights given above. Using this spacing provides a signal at the dominant frequency and desired dip to pass unattenuated by the filter.

The success of the specified dip filter is not particularly sensitive to this design methodology. The removal of a large portion of the horizontal dip component is beneficial, while keeping a large portion of the diffraction dips that are present in the data.

In various aspects the filtering may be adjusted to remove certain portions of the seismic data, such as flat segments and high angle segments. Accordingly, as may be appreciated, the filtering may be designed to capture certain portions of the data. For example, the filter may be configured to maintain between about 50% and about 5% of the maximum dip of the diffraction, between about 40% and about 8% of the maximum dip of the diffraction or between about 30% and about 12% of the maximum dip of the diffraction. The remaining portion may be discarded or muted In other aspects, the filtering may include masking a portion of the seismic data in the body of water between the surface and a specific depth below the surface. As an example, the filtering may mask at least of the portion of seismic data from the surface of the body of water to 500 meters below the surface of the body of water; from the surface of the body of water to 700 meters below the surface of the body of water, and/or from the surface of the body of water to 900 meters below the surface of the body of water.

The method may also include a validation step to further enhance the reliability of the method by lessening uncertainty associated with the seepage locations. The validation step may include validating seepage locations through various techniques. For example, the seepage locations may be validated by using high amplitude diffraction anomalies that appear after the screening filter is applied to the seismic data. The validation steps may include identification of locally high amplitude diffraction anomaly zones that are nearly vertical; identifying and removing source-noise anomalies, such as typically appear in the earlier times (less than about one second); identification of structural features (e.g., water-bottom bathymetric features) that could be related to a candidate plume; and/or validation of suspected diffraction anomalies by comparison with pre-stack data to differentiate hyperbolic signals from likely noise effects.

As an example, the validating step may include identifying one or more clusters of diffraction anomalies; and comparing the one or more clusters with a seepage plume pattern to determine the seepage locations. As another example, the validating step may include identifying one or more clusters of diffraction anomalies; identifying one or more subsurface structural features in the survey region (such as bathymetric, shallow seismic features and/or faults); comparing the one or more clusters with subsurface structural features to determine the seepage locations (e.g. visual inspection or spatial relationship calculation). Further still, the potential bubble plume locations can be validated by comparison of the identified high amplitude diffraction anomalies with the corresponding prestack data at the same locations. Diffractions may appear in the prestack data as hyperbolic events in the prestack gathers. Alternatively, false diffractions (anomalies) due to noise may appear in the prestack gathers as selected high-noise traces or other patterns that do not fit the expected hyperbolic curvature at water velocity. As yet another example, the validating step may include performing one or more of ocean magnetic and gravity surveys; optical sensing survey and thermal anomalies detection survey to obtain measurement data; and comparing the measurement data with the filter seismic data to determine the seepage locations. In yet another example, the validating step may include obtaining biological and chemical samples of one or more of fluids, gases, and sediments in the survey region; identifying one or more clusters of diffraction anomalies from the filtered seismic data; and comparing the one or more clusters of diffraction anomalies with the obtained biological and chemical samples to determine the seepage locations. As may be appreciated, one or more of these validation steps may be combined together to further lessen uncertainty with regard to the seepage locations.

The present techniques may also include other processing steps to lessen uncertainty. For example, the method may include creating a satellite imagery of the survey region, which may include chemical information, biological information, and other measurement information, as well.

Beneficially, the use of this filter step and the optional use of the validation step provide a pre-drill technology that may determine the presence and location of thermogenic hydrocarbon seepages from the seafloor. Further, this method may be utilized to locate seafloor hydrocarbon seeps accurately and cost-effectively over the basin-to-play scale as a means to enhance basin assessment and to high-grade areas for exploration. For example, as the seismic data may be collected for the subsurface (e.g., below the seafloor) locations regardless, the analysis of filtered seismic data may involve processing previously collected or concurrently collected seismic surveys. As a result, the processing of seismic data for at least a portion of the water column portion of the seismic data may lessen uncertainty, with minimal additional cost. Accordingly, this method provides geoscientists with an enhanced identification technique for hydrocarbon accumulations and increases the confidence in the identified hydrocarbon accumulations. Various aspects of the present techniques are described further in FIGS. 1 to 5.

Figure 1:
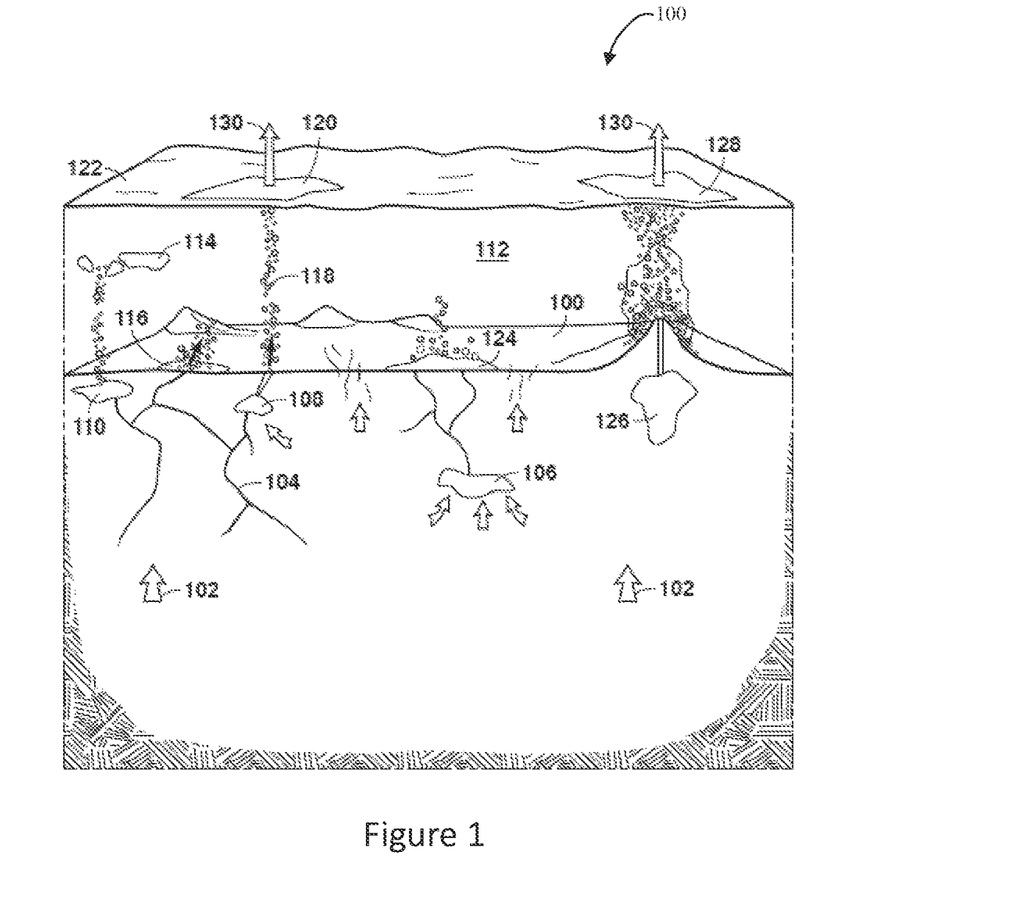
FIG. 1 is a side elevational view of a seafloor.

FIG. 1 is a diagram illustrating the numerous subsurface sources and migration pathways of hydrocarbons present at or escaping from seeps on the ocean floor 100. Hydrocarbons 102 generated at source rock (not shown) migrate upward through faults and fractures 104. The migrating hydrocarbons may be trapped in reservoir rock and form a hydrocarbon accumulation, such as a gas 106, oil and gas 108, or a gas hydrate accumulation 110. Hydrocarbons seeping from the gas hydrate accumulation may dissolve into methane and higher hydrocarbons (e.g., ethane, propane) in the ocean 112 as shown at 114, or may remain as a gas hydrate on the ocean floor 100 as shown at 116. Alternatively, oil or gas from oil/gas reservoir 108 may seep into the ocean, as shown at 118, and form an oil slick 120 on the ocean surface 122. A bacterial mat 124 may form at a gas seep location, leaking from gas reservoir 106, and may generate biogenic hydrocarbon gases while degrading thermogenic wet gas. Still another process of hydrocarbon seepage is via a mud volcano 126, which can form an oil slick 128 on the ocean surface. Oil slicks 120 and 128 or methane (and e.g., ethane, propane, etc.) gas 130 emitted therefrom are signs of hydrocarbon seepage that are, in turn, signs of possible subsurface hydrocarbon accumulation. The signatures measured from each of these seeps may be analyzed according to disclosed methodologies and techniques herein to discriminate between the different origins of hydrocarbons encountered at these seeps. In particular, methodologies and techniques, such as those disclosed in Intl. Patent Application Publication No. 2013/071185, may discriminate between hydrocarbons that have migrated directly to the surface without encountering a trap within which they can be accumulated (e.g., a first source) and hydrocarbons that have leaked from a subsurface accumulation (e.g., a second source). If the presence and volume of such a hydrocarbon accumulation can be identified, it is possible the hydrocarbons from such an accumulation can be extracted.

Figure 2:
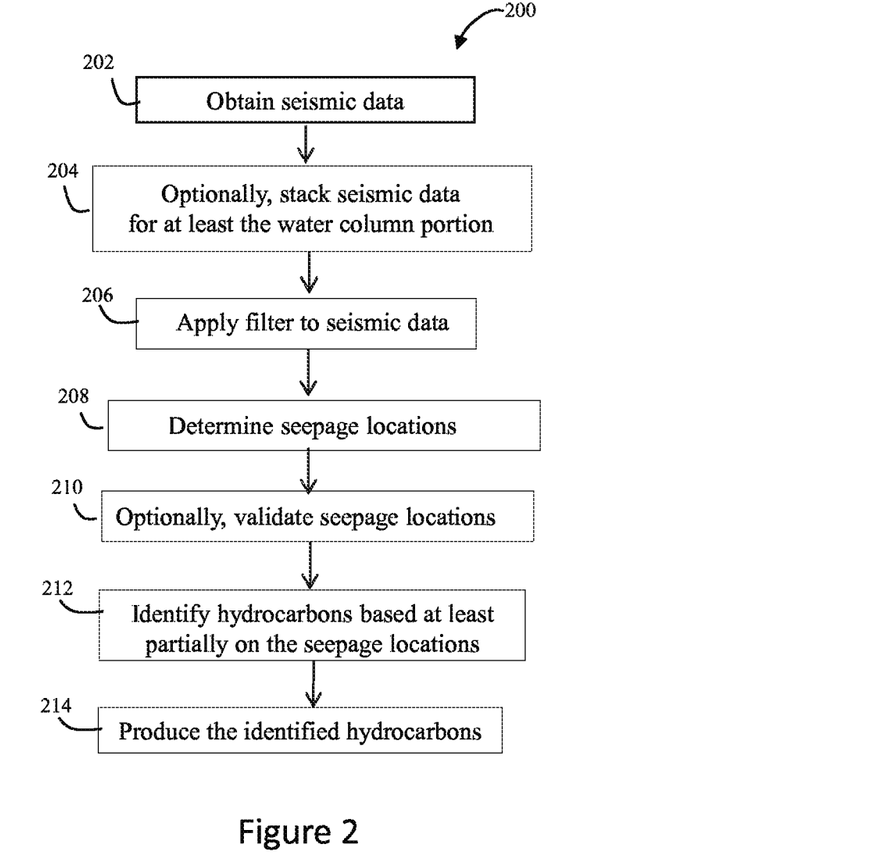
FIG. 2 is a flow chart for performing hydrocarbon exploration in accordance with an exemplary embodiment of the present techniques.

FIG. 2 is a flow chart 200 for performing hydrocarbon exploration in accordance with an exemplary embodiment of the present techniques. In this flow chart 200, the seismic data for a survey region is obtained, as shown in block 202, seismic data is processed to identify seepage locations, as shown in blocks 204 to 208, the seepage locations are validated, as shown in block 210, and hydrocarbons are identified and produced, as shown in blocks 212 and 214. The filtering of the seismic data enhances the processing by lessening the uncertainty associated with seepage locations.

To begin, seismic data is obtained, as shown in block 202. The obtaining of the seismic data may include determining a survey region; acquiring measured seismic data and performing some initial processing on the measured seismic data. Alternatively, the seismic data may be obtained from a previously performed survey.

Once the seismic data is obtained, the processing of the seismic data may be performed, as shown in blocks 204 to 208. In block 204, the seismic data may optionally be stacked to form stacked seismic data. The stacking of the seismic data may include combining seismic traces together to lessen interference from noise in the individual seismic traces and enhance the quality of the data. The stacking may include full stacks, partial stacks, slant stacks and other stacking techniques. As an example, the CMP stacking techniques may be utilized to form CMP gathers from the seismic traces. Then, at block 206, a filter is applied to the seismic data, which may be the measured seismic data or stacked seismic data. The filter enhances the detection of bubble plume anomalies (e.g., by reducing the horizontal or nearly horizontal, and optionally random components, with respect to higher angle diffractions anomalies). The filter is explained further with reference to FIG. 3 below. From the filtered seismic data, seepage locations are identified, as shown in block 208. The identification of seepage locations may include visually inspecting the images of the seismic data to indicate seepage locations or using instructions executed on a computer to highlight potential seepage locations. As an example, potential anomalies are first identified by having amplitude that is larger than the surrounding values. The amplitudes may be examined from the filtered data or from an envelope recovered from the filtered data. For true amplitude data, anomalies can also be identified by the actual signal diffraction amplitude. Bubble plume anomalies of interest would likely have absolute amplitudes that are about 0.0001 or larger.

At block 210, the seepage locations may be validated. As noted above, the validation of seepage locations may include various techniques that use high amplitude diffraction anomalies from the filtered seismic data. The validation steps may include identification of locally high amplitude zones that are nearly vertical; identifying and removing source-noise anomalies, such as typically appear in the earlier times (less than about one second); identifying structural features (e.g., water-bottom bathymetric features) that could be related to a candidate plume; and/or validating suspected high amplitude diffraction anomalies by comparison with pre-stack data to differentiate hyperbolic signals from likely noise effects. Other examples of different data that may be utilized to validate the seepage locations are described in Intl. Patent Application Publication No. 2013/071185, which is hereby incorporated by reference in its entirety. The validation step may include one or more of these techniques either individually or combined together to further lessen uncertainty with regard to the seepage locations.

Once the seepage locations are determined, the hydrocarbons are identified and produced, as shown in blocks 212 and 214. In block 212, hydrocarbons are identified based at least partially on the identified seepage locations. As an example, the identified seepage locations may be integrated with other measured data or subsurface models of the subsurface regions below the survey region (e.g., locations below the see floor). The validated anomalies can then be further evaluated by geochemical analysis from, for example, a sample collection step such as a drop-core survey. The drop-core survey (or other geochemical survey) may target bathymetric or other anomalies (e.g., pock marks or faults) that are identified during the validation step as possible source points for the plume anomaly. These different types of data may be integrated based on location information associated with the respective data to lessen uncertainty associated with the existence of hydrocarbons. Finally, the identified hydrocarbons may be produced, as shown in block 214. With the identification of hydrocarbons, drilling of a well may be performed to provide access to the hydrocarbon accumulation. Further, the production may include installing a production facility configured to monitor and produce hydrocarbons from the production intervals that provide access to the hydrocarbons in the subsurface formation. The production facility may include one or more units to process and manage the flow of production fluids, such as hydrocarbons and/or water, from the formation. To access the production intervals, the production facility may be coupled to a tree and various control valves via a control umbilical, production tubing for passing fluids from the tree to the production facility, control tubing for hydraulic or electrical devices, and a control cable for communicating with other devices within the wellbore.

Beneficially, this method provides an enhancement in the exploration of hydrocarbons. In particular, the method may be utilized prior to drilling operations to reduce exploration risk by providing more information about the presence and location of thermogenic hydrocarbon seepages from the seafloor. Further, by using seismic data, the method may be more cost effective than other remote sensing techniques. As a result, this method enhances basin assessment and techniques to high-grade areas for exploration. Further, the integration of the seismic data with gravity, magnetics, and acoustic data from other surface surveys, subsurface model or other information may provide additional insights to enhance the exploration activities.

FIG. 3 is an exemplary graph 300 of response 302 for a vertically moving bubble. In this graph 300, a response 302 is shown relative to a distance along stacked section 304 verses time 306. This is a seismic diffraction anomaly response for a spatially localized acoustic velocity or density variation. A bubble plume can be thought of as a set of such localized variations that would appear in the data as a collection of diffraction anomaly responses.

As may be appreciated, various sections of the response 302 may be filtered to reduce the noise in the seismic data associated with the water column. For example, region 308 represents the flat segments of the response 302. The flat segments are the flat dips that occur at the same dips as much of the source noise and unwanted water column layering. The filter applied to the seismic data may remove the seismic data in region 308 of the response 302. By removing this portion of the dip spectrum, a portion of the diffraction anomaly signal is removed to lessen a larger portion of the interfering noises and unwanted water column layering. Region 310 represents the high angle information, which is typically lost due to the receiver array configuration (e.g., water velocity related maximum dip). While these data may be useful, it may also be filtered in certain embodiments. The regions of the response between these two regions 308 and 310 are the shoulder dips that have preferred signal to noise ratios for the seismic data in the water column.

The dashed responses 311 to 314 provide tangent lines for the response 302. The response 311 is at a point on the response 302 that is proportionally related to the water velocity (e.g., about 1.3 ms/m). The response 312 is at a point on the response 302 that is proportionally related to the desired data range of about 0.26 ms/m. The response 314 is at a point on the response 302 that is proportionally related to the horizontal maximum (e.g., at 0 ms/m). As may be appreciated, the filtering may be designed to capture certain portions of the response 302. For example, the filter may be configured to maintain between about 50% and about 5% of the maximum dip of the diffraction, between about 40% and about 8% of the maximum dip of the diffraction or between about 30% and about 12% of the maximum dip of the diffraction. The remaining portion may be discarded or muted.

As an example, the screening filter may include input from a stacked 2D line that has been processed to retain the water-column data. The processing of the seismic data to retain the water-column data may include velocity picking in the water column, a muting to remove sub-water bottom data, source-noise muting and/or other filtering to reduce residual source noises. Stacked 3D data may be handled in a similar manner to a set of stacked 2D lines in the screening step.

Figure 4A:
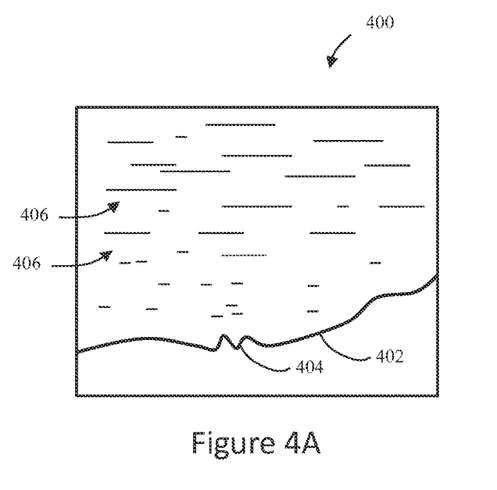
FIGS. 4A, 4B and 4C represent exemplary stacked water-column data diagrams.

FIGS. 4A, 4B, and 4C represent stacked water-column data diagrams. In FIG. 4A, a diagram 400 represents stacked seismic data in the water column, which includes numerous flat segments from residual source noise or water layering. This diagram 400 represents the stacked seismic data before the screening filter is applied. In this diagram 400, the area above the seafloor 402 is the water column. The seafloor 402 has a structural feature 404 (e.g., water-bottom bathymetric feature), which is a seep in this diagram 400. Also, numerous artifacts 406 (e.g., the flat segments) are represented in the water column, the bubbles are difficult to detect in this seismic data.

Figure 4B:
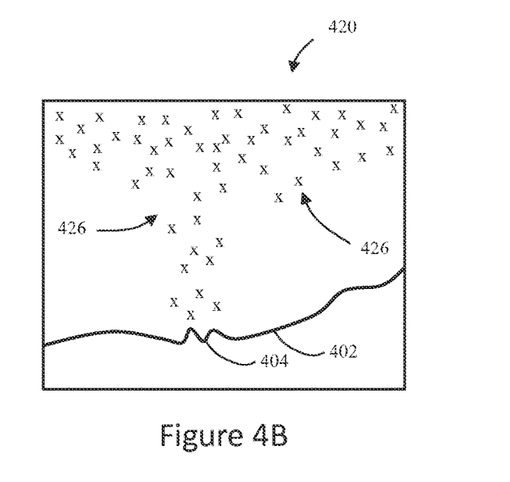

In FIG. 4B, a diagram 420 represents stacked seismic data in the water column after application of the screening filter. In this diagram 400, the area above the seafloor 402 is the water column and the structural feature 404 is a seep. The numerous artifacts 426 are represented in the water column. As shown in this diagram 420, the flat-lying energy has been largely removed leaving potential bubble-plume anomalies as indicated by the signals 426. Thus, the filtering of the seismic data provides a clearer indication of the location of a hydrocarbon seep.

Figure 4C:
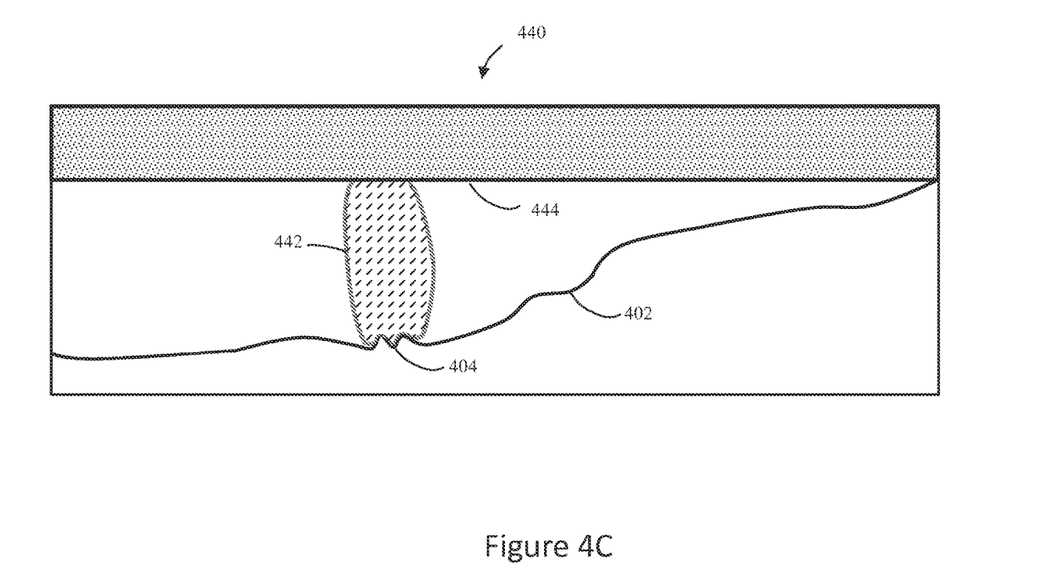

In FIG. 4C, a diagram 440 represents the full 2D seismic water-column data and shows the high amplitude diffraction anomaly 442 as a narrow vertical feature that is a potential bubble plume. The water-bottom feature 404 below this anomaly provides validation that the anomaly may be a plume associated with a hydrocarbon seep. The high amplitude shallow portion 444 represents residual artifacts from source noise or unwanted thermohaline layering, which is found in shallower depths. Accordingly, from this diagram 440, the masking may be applied to remove the water column seismic data that is shallower than a certain depth. For example, the water depths shallower than 900 meters (m), shallower than 700 m, and/or shallower than 500 m, may be filtered or masked to simplify interpretation. That is, the filtering may include masking a portion of the seismic data in the body of water between the surface and a specific depth below the surface. As an example, the filtering may mask at least of the portion of seismic data from the surface of the body of water to 500 meters below the surface of the body of water; from the surface of the body of water to 700 meters below the surface of the body of water, and/or from the surface of the body of water to 900 meters below the surface of the body of water.

Figure 5:
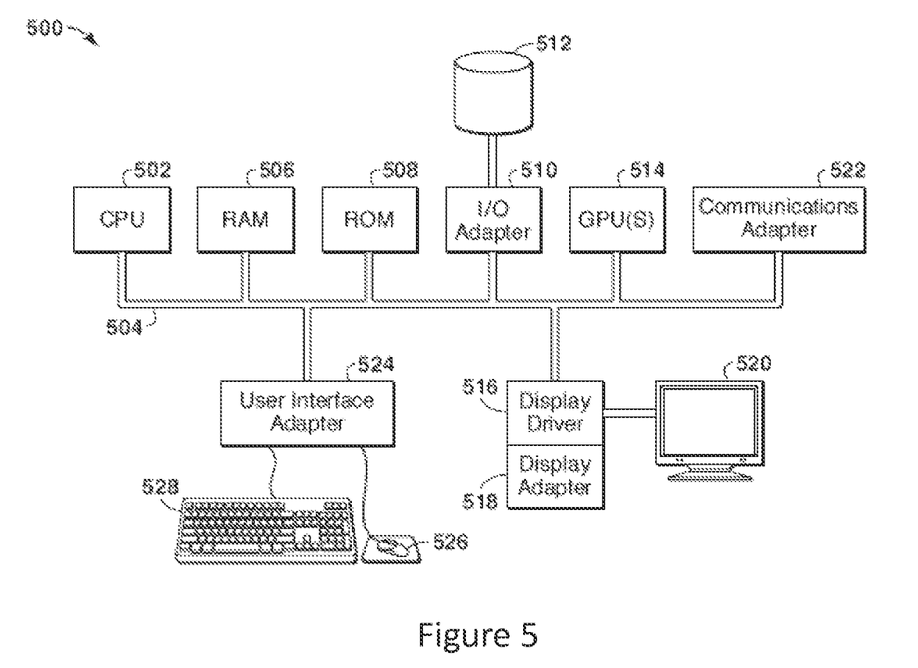
FIG. 5 is a block diagram of a computer system that may be used to perform any of the methods disclosed herein.

As an example, FIG. 5 is a block diagram of a computer system 500 that may be used to perform any of the methods disclosed herein. A central processing unit (CPU) 502 is coupled to system bus 504. The CPU 502 may be any general-purpose CPU, although other types of architectures of CPU 502 (or other components of exemplary system 500) may be used as long as CPU 502 (and other components of system 500) supports the inventive operations as described herein. The CPU 502 may execute the various logical instructions according to disclosed aspects and methodologies. For example, the CPU 502 may execute machine-level instructions for performing processing according to aspects and methodologies disclosed herein.

The computer system 500 may also include computer components such as a random access memory (RAM) 506, which may be SRAM, DRAM, SDRAM, or the like. The computer system 500 may also include read-only memory (ROM) 508, which may be PROM, EPROM, EEPROM, or the like. RAM 506 and ROM 508 hold user and system data and programs, as is known in the art. The computer system 500 may also include an input/output (I/O) adapter 510, a communications adapter 522, a user interface adapter 524, and a display adapter 518. The I/O adapter 510, the user interface adapter 524, and/or communications adapter 522 may, in certain aspects and techniques, enable a user to interact with computer system 500 to input information.

The I/O adapter 510 preferably connects a storage device(s) 512, such as one or more of hard drive, compact disc (CD) drive, floppy disk drive, tape drive, etc. to computer system 500. The storage device(s) may be used when RAM 506 is insufficient for the memory requirements associated with storing data for operations of embodiments of the present techniques. The data storage of the computer system 500 may be used for storing information and/or other data used or generated as disclosed herein. The communications adapter 522 may couple the computer system 500 to a network (not shown), which may enable information to be input to and/or output from system 500 via the network (for example, a wide-area network, a local-area network, a wireless network, any combination of the foregoing). User interface adapter 524 couples user input devices, such as a keyboard 528, a pointing device 526, and the like, to computer system 500. The display adapter 518 is driven by the CPU 502 to control, through a display driver 516, the display on a display device 520. Information and/or representations of one or more 2D canvases and one or more 3D windows may be displayed, according to disclosed aspects and methodologies.

The architecture of system 500 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In one or more embodiments, the method may be implemented in machine-readable logic, set of instructions or code that, when executed, performs a method to determine and/or estimate the seepage locations. The code may be used or executed with a computing system such as computing system 500. The computer system may be utilized to store the set of instructions that are utilized to manage the data, the different measurement techniques, and other aspects of the present techniques.

As an example, a computer system for detecting hydrocarbons may include a processor; memory coupled to the processor; and a set of instructions, stored in the memory and when executed, are configured to: obtain seismic data associated with a body of water in a survey region; apply a filter to at least a portion of the seismic data to enhance diffraction anomaly signals with respect to horizontal or nearly horizontal signals associated with the water-column to form filtered seismic data; and determine seepage locations based on the filtered seismic data. The set of instructions may also be configured to apply the filter to the seismic data to maintain seismic data in the range between about 50% and about 5% of the maximum dip of a diffraction and discard data outside the range; and/or apply mask the seismic data from the surface of the body of water to 500 meters below the surface of the body of water; from the surface of the body of water to 700 meters below the surface of the body of water; or from the surface of the body of water to 900 meters below the surface of the body of water.

In other embodiments, the set of instructions may be specifically configured to perform other tasks. For example, the set of instructions may be configured to identify diffraction anomalies in the filtered seismic data as the seepage locations; create a satellite imagery map of the survey region; stack the seismic data prior to applying the filter on the seismic data; apply the filter removes flat-lying energy from the seismic data and retains dip characteristic of plumes from seepage locations; apply the filter removes horizontal signals and noises based on dip; and/or apply the filter comprising applying a weighted trace mix filter, wherein the trace weights sum to zero to ensure removal of flat energy.

In other embodiments, the set of instructions may be configured to validate diffraction anomalies in the filtered seismic data as the seepage locations. The validation may include: (i) identifying one or more clusters of diffraction anomalies, and comparing the one or more clusters with an expected seepage plume pattern to determine the seepage locations; (ii) identifying one or more clusters of diffraction anomalies, identifying one or more subsurface structural features in the survey region, comparing the one or more clusters with subsurface structural features to determine the seepage locations; (iii) obtaining the unstacked seismic data collocated with the anomalies, examining the unstacked data to determine the origin of the high-amplitude anomalies, and determining that the anomaly origin is consistent with a hyperbolic diffraction anomaly source; (iv) performing one or more of ocean; magnetic and gravity surveys; optical sensing survey, synthetic aperture radar slick detection and thermal anomalies detection survey to obtain measurement data, and comparing the measurement data with the filter seismic data to determine the seepage locations; and/or (v) obtaining biological and chemical samples of one or more of fluids, gases, and sediments in the survey region; identifying one or more clusters of diffraction anomalies from the filtered seismic data; comparing the one or more clusters of diffraction anomalies with the obtained biological and chemical samples to determine the seepage locations.

In one or more embodiments, the method may utilize a combination of satellite, airborne, acoustic and seismic techniques along with underwater sensors to characterize and map hydrocarbons in a marine environment. The combination of geophysical techniques along with underwater sensors provides a more complete characterization and mapping of hydrocarbons in the marine environment over play to basin scale exploration areas. As an example, the various independent technologies may include remote sensing (e.g., satellite and/or airborne), seismic and acoustic imaging (e.g., ship-based initially: multibeam echosounder, side-scan sonar, sub-bottom profiler; which may also be included in AUV for unsurpassed imaging due to proximity to seafloor, but much more local in scope), magnetic and gravity surveying (either from ship or air-based tools, or from AUV more locally), chemical sensing (AUV: primarily mass spectrometer and fluorometer), and sediment, biological and chemical sampling (e.g., piston cores typically, but may preferably utilize an underwater vehicle to obtain sediment, fluid (oil, water), or and/or gas samples for noble gases and isotopologues, and biology). The method may utilize airborne vehicles and marine vessels (e.g., ships and/or underwater vehicles (e.g., unmanned underwater vehicles, which may include remotely operated vehicles (ROVs) or autonomous underwater vehicles (AUVs)). When combined into an integrated method, these technologies may determine the presence and location of thermogenic hydrocarbon seepages from the seafloor to be determined.

In one or more embodiments, the method may include validating or integrating remote sensing techniques with the filtered seismic data. The remote sensor techniques may include ocean; active acoustic sensing (multibeam echo sounder, two dimensional (2D) seismic, three dimensional (3D) seismic, sub-bottom profiler, side scan sonar, etc.); imagery and spectroscopy of slicks and atmospheric gas plumes (e.g., infrared (IR) to detect atmospheric gases, radar reflectivity, etc.); towed chemical sensors (mass spectrometer, etc.); passive acoustic sensing; discrete sampling from surface vessel of air, water, or soil at various locations; drop and piston cores; magnetic and gravity surveys; optical sensing; thermal anomalies detection; and/or any other remote sensing technique. These remote sensing techniques may be performed via satellites, airborne vessels, and/or marine vessels. As an example, the filtered seismic data may be validated with multibeam backscatter data, which may provide subsurface structural features (e.g., anomalous sea-bottom hardness, roughness, and/or volumetric heterogeneity in the shallow sub-bottom and by examining the bathymetry data collected for local highs, lows, fault lines, pock marks and other geologic indicators that may be consistent with permeable pathways for hydrocarbon migration to the seafloor). Accordingly, interpretations made from these validated seepage locations may allow geologic interpretations or models to be constructed about possible hydrocarbon "plays" or prospects, based on this initial information. These potential areas may again be useful targets to determine whether thermogenic hydrocarbons are present as seeps.

In one or more embodiments, the method may include validating or integrating direct measurement techniques with the filtered seismic data. The direct measurement techniques may include deploying an underwater vehicle to a seepage location, which may be one of various seepage locations identified from the filtered seismic data, and processing the measurement data. The direct measurement techniques may include fluorescence polarization techniques, fluorometric techniques, methane or other chemical compound detection techniques (e.g., obtaining mass spectrometric data or gas chromatography (GC) data), biological and chemical sampling techniques, temperature measurement techniques, camera capturing techniques and/or other measurement components. The analysis of samples may include clumped isotope geochemistry, noble gas geochemistry, and microbiology. These analysis techniques are described in International Publication No. PCT/US2013/021258; International Publication No. PCT/US2013/033160; and International Publication No. PCT/US2012/052542.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

The invention claimed is:

1. A method for detecting hydrocarbon seepage locations comprising:
    obtaining seismic data associated with a body of water in a survey region;
    applying a filter to at least a portion of the water column portion of the seismic data to enhance diffraction anomaly signals with respect to horizontal or nearly horizontal signals associated with the water-column to form filtered seismic data, wherein applying the filter removes flat-lying energy from the seismic data and retains dip characteristics of plumes from hydrocarbon seepage locations;
    determining hydrocarbon seepage locations from the seafloor based on the filtered seismic data.

2. The method of claim 1, further comprising identifying diffraction anomalies in the filtered seismic data as the hydrocarbon seepage locations.

3. The method of claim 2, further comprising validating diffraction anomalies in the filtered seismic data as the hydrocarbon seepage locations.

4. The method of claim 3, wherein validating diffraction anomalies comprises:
    identifying one or more clusters of diffraction anomalies; and
    comparing the one or more clusters with an expected seepage plume pattern to determine the hydrocarbon seepage locations.

5. The method of claim 3, wherein validating diffraction anomalies comprises:
    identifying one or more clusters of diffraction anomalies;
    identifying one or more subsurface structural features in the survey region;
    comparing the one or more clusters with subsurface structural features to determine the hydrocarbon seepage locations.

6. The method of claim 3, wherein validating diffraction anomalies comprises:
    obtaining the unstacked seismic data collocated with the anomalies;
    examining the unstacked data to determine the origin of the high-amplitude anomalies;
    determining that the anomaly origin is consistent with a hyperbolic diffraction anomaly source.

7. The method of claim 3, wherein validating diffraction anomalies comprises:
    performing one or more of ocean survey, magnetic and gravity surveys, optical sensing survey, synthetic aperture radar slick detection survey, and thermal anomalies detection survey to obtain measurement data; and
    comparing the measurement data with the filtered seismic data to determine the hydrocarbon seepage locations.

8. The method of claim 3, wherein validating diffraction anomalies comprises:
    obtaining samples of one or more fluids, gases, and sediments in the survey region;
    analyzing the samples to determine chemical information or biological information about the samples;
    identifying one or more clusters of diffraction anomalies from the filtered seismic data;
    comparing the one or more clusters of diffraction anomalies with the chemical information or biological information to determine the hydrocarbon seepage locations.

9. The method of claim 1, further comprising creating a satellite imagery of the survey region.

10. The method of claim 1, further comprising stacking the seismic data prior to applying the filter on the seismic data.

11. The method of claim 1, further comprising masking at least a portion of seismic data below the surface prior to applying the filter on the seismic data.

12. The method of claim 11, wherein masking at least a portion of seismic data comprises masking the seismic data from the surface of the body of water to 700 meters below the surface of the body of water.

13. The method of claim 1, further comprising masking a portion of the seismic data in the body of water between the surface and a specific depth below the surface.

14. The method of claim 13, wherein masking at least a portion of seismic data comprises masking the seismic data from the surface of the body of water to 500 meters below the surface of the body of water.

15. The method of claim 1, wherein the applying the filter removes horizontal signals and noises based on dip.

16. The method of claim 1, wherein the applying the filter comprises applying a weighted trace mix filter, wherein the trace weights sum to zero to ensure removal of flat energy.

17. The method of claim 1, wherein the applying the filter comprises applying a filter to process data in the range between about 50% and about 5% of the maximum dip of the diffraction and discard data outside the range.

18. The method of claim 1, wherein applying the filter to at least a portion of the seismic data further comprises applying the filter to at least a portion of the seismic data to enhance diffraction anomaly signals with respect to random signals associated with the water-column to form filtered seismic data.

19. A computer system for detecting hydrocarbon seepage locations comprising:
a processor;
memory coupled to the processor; and
a set of instructions, stored in the memory and when executed, are configured to:
obtain seismic data associated with a body of water in a survey region;
apply a filter to at least a portion of the water column portion of the seismic data to enhance diffraction anomaly signals with respect to horizontal or nearly horizontal signals associated with the water-column to form filtered seismic data, wherein applying the filter removes flat-lying energy from the seismic data and retains dip characteristics of plumes from seepage locations; and
determine hydrocarbon seepage locations based on the filtered seismic data.

20. The computer system of claim 19, wherein the set of instructions are configured to apply the filter to the seismic data to maintain seismic data in the range between about 50% and about 5% of the maximum dip of a diffraction and discard data outside the range.

21. The computer system of claim 19, wherein the set of instructions are further configured to mask the seismic data from the surface of the body of water to 700 meters below the surface of the body of water.

* * * * *